United States Patent [19]

Inazaki et al.

[11] Patent Number: 4,588,297
[45] Date of Patent: May 13, 1986

[54] OPTICAL PROFILE MEASURING METHOD

[75] Inventors: Koji Inazaki; Takashi Nangai, both of Muroran; Yasutomo Fujimori; Hiroichi Kimura, both of Yokohama, all of Japan

[73] Assignees: Nippon Steel Corporation; Tokyo Shibaura Denki Kabushiki Kaisha, both of Kawasaki, Japan

[21] Appl. No.: 502,112

[22] Filed: Jun. 8, 1983

[30] Foreign Application Priority Data

Jun. 14, 1982 [JP] Japan ................................ 57-101648
Mar. 23, 1983 [JP] Japan ................................ 58-47251

[51] Int. Cl.$^4$ ........................ G01B 11/24; G01B 11/14
[52] U.S. Cl. ................................. 356/376; 356/375; 356/1; 356/4; 414/161
[58] Field of Search ........................ 356/1, 4, 375, 376; 414/161

[56] References Cited

U.S. PATENT DOCUMENTS 3,633,010 1/1972 Svetlichny ............................ 356/1
4,226,536 10/1980 Dreyfus et al. ...................... 356/376

FOREIGN PATENT DOCUMENTS 0107108 8/1981 Japan ................................. 356/376
3222462 2/1983 Fed. Rep. of Germany ............ 375/

Primary Examiner—R. A. Rosenberger
Assistant Examiner—Crystal Cooper
Attorney, Agent, or Firm—Cushman, Darby & Cushman

[57] ABSTRACT

The profile of the upper surface of the material being processed in a blast furnace is determined by pulsing a laser beam at the surface while incrementally changing the angle of the emitter to the surface, along a predetermined path, and sensing reflections of the beam using a detector having a relatively small angle of view compared with the area of the surface, the detector being located a fixed distance from the emitter. Points along the profile are calculated by triangulation, from the emitting and detection angles, and the known distance between the emitter and detector. In making the calculations, the amount that the emitting angle has changed may be determined by finding the amount that the reflection of the beam has deviated from a datum location on the detector. Ways of simplifying this calculation by making first approximation assumptions are disclosed.

7 Claims, 11 Drawing Figures

OPTICAL PROFILE MEASURING METHOD

BACKGROUND OF THE INVENTION

1. Field of the Invention

This invention relates to a method for measuring a surface profile of a material contained in a container by use of a laser beam, more particularly, but not exclusively, to a method for optical measurement of a top surface profile of charges in a blast furnace.

2. Description of the Prior Art

In a blast furnace, coke and iron ore are alternately poured from the furnace top into the furnace. Therefore, the top surface of the charges in the furnace usually takes on a concave shape. The profile of the surface is very important in terms of the fuel consumed by the furnace. This is particularly significant in view of the need to conserve resources.

To control the top surface profile for the optimal fuel consumption, precise measurement is essential. In such measurement, remote control is necessary because of the extremely high temperature and pressure inside the furnace.

There is known an optical surface profile meter for measuring the top profile of charges in a blast furnace by the use of laser beams. The profile meter has a light emitter and a light receiver. The light emitter issues laser beams onto the top surface of the charge in the blast furnace, and the light receiver receives the laser beams reflected by the top surface of the charge. The surface profile of the charge is determined from the light emitting angles (projection angles) and light receiving angles (reception angles) by triangulation.

The prior art used a light receiver with a large field of view. Use of a light receiver with a large field of view eliminated the need for a movable receiver since the receiver could receive reflected light beams over a large range of reflection angles while fixed in one position. In other words, the receiver did not have to follow or track changes in the reflection angles of the reflected light beams. This is important in view of the technical difficulties in achieving exact and simple tracking.

A light receiver having a large field of view, however, has the drawback of a low resolving power. The low resolving power makes precise measurement of the surface profile of a charge in a blast furnace next to impossible. For example, if the resolving power per unit field of view of light receiver with a large field is 1/100 of the total field, the overall resolving power is only 1/100 of the total field.

On the contrary, if the resolving power per unit field of view of the receiver with a small field is 1/100 of the total field, supposing its unit field is 1/10 of the total field, overall resolving power would be 1/1000 of the total field.

Therefore, when a high resolving power is necessary, e.g., when it is desired to precisely measure the profile of the top surface of a charge in a blast furnace, a light receiver having a small field of view must be used. Such a receiver, however, has to be made to move in accordance with the change of the reflection angles of the light beams reflected from the top surface of the charge, which is, as explained above, technically difficult.

SUMMARY OF THE INVENTION

Accordingly, the primary object of the present invention is to provide an optical profile measuring method utilizing a new, improved light receiver tracking system enabling quick and accurate measurement of, for example, the profile of the top of a charge in a blast furnace.

To achieve the object of the invention as mentioned above, according to one aspect of the present invention, there is provided a method for measuring a surface profile of a material contained in a container by use of an optical detector (i.e., the light receiver) capable of angular tracking and having a light receiver of a small field of view, comprising a first step for detecting a first point on the surface of the material, a second step for detecting a second point on the surface of the material adjacent to the first point thus detected, and a third step for successively detecting succeeding n (n is a positive integer more than 2) points (e.g., 20 points) on the surface of the material by repeating the second step.

The first step comprises emitting a laser beam onto a point on the surface of the material to be measured from a predetermined light emitting position at a light emitting angle $\alpha_1$, detecting a light receiving angle $\beta_1$ of a laser beam which is reflected at the above-mentioned point of the surface of the material and which is focused onto a center of the small field of view of the light receiver to form a beam spot, at a predetermined light receiving position which is spaced at a distance L from the light emitting position, by causing angular movement of the receiver, and calculating the above-mentioned point as a known first point by triangulation from the two angles $\alpha_1$ and $\beta_1$ and the distance L.

The second step comprises changing the light emitting angle through a small angle into $\alpha_2$ so that the laser beam is incident upon a second point on the surface of the material adjacent to the first point, detecting deviation of a beam spot of a laser beam which is reflected at the second point formed on the light receiver, from the center of the field of view, at which the beam spot of the light beams reflected at the first point is formed, detecting a light receiving angle $\beta_2$ of the laser beam reflected at the above-mentioned second point of the surface of the material at the predetermined light receiving position by the deviation, calculating the above-mentioned second point as a known second point by triangulation from the two angles $\alpha_2$ and $\beta_2$ and the distance L, and moving the light receiver by a small angle $\Delta\beta$ equal to $(\beta_2-\beta_1)$ so that the beam spot of the light beams reflected at the second point comes into the center of field of view of the light receiver.

In the succeeding step, the light emitting angle varies by any small angle at one time.

According to another aspect of the present invention, in the second step, the second point is as a first approximation assumed to be identical to an imaginary point which is spaced from the first point at a predetermined small distance in the horizontal and/or the vertical direction, so that a preliminary value for the light receiving angle of the light beam reflected at the imaginary point can be obtained. After the light emitting angle is changed into $\alpha_2$, in the second step, the light receiver is moved by a small angle $\Delta\beta'$ so that the receiving angle is $\beta_2'$. The beam spot of a light beam reflected at the imaginary point would come to a center of field of view when the receiving angle is $\beta_2'$. The second point can be detected by deviation of the beam spot of the beam reflected from the second point formed on the light receiver, from the center of the field of view of the receiver.

DESCRIPTION OF THE PREFERRED EMBODIMENT

Figure 1:
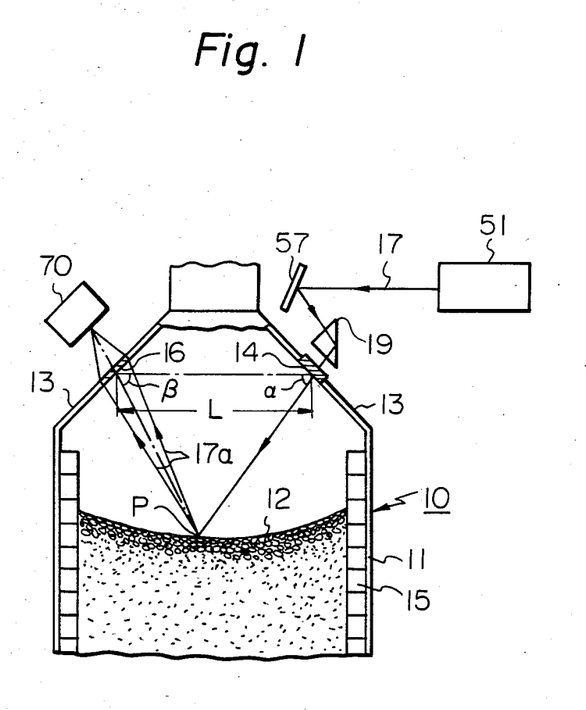
FIG. 1 is a schematic view of a blast furnace showing how to measure the profile of the top of a charge therein according to the present invention.
Figure 2:
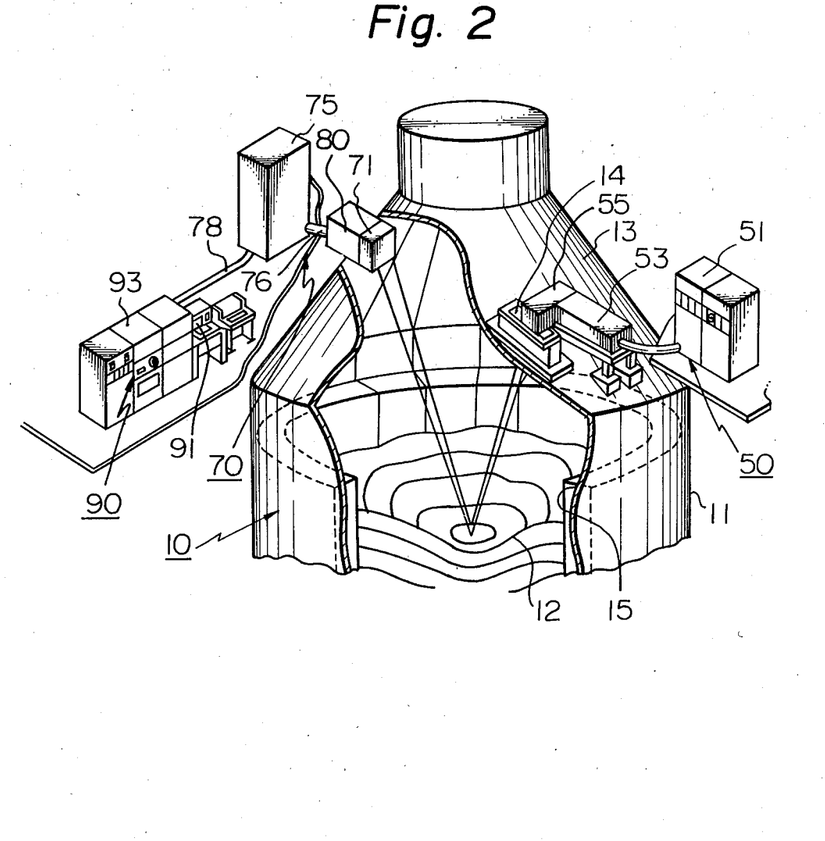
FIG. 2 is a partially broken perspective view of an actual arrangement of FIG. 1.

Referring now to FIGS. 1 and 2, there is shown a schematic view of an upper part of a blast furnace 10 to which the invention is applied.

Coke and iron ore are alternately poured into the blast furnace 10, resulting in a concave top surface of the charge 12.

The profile of the top surface of the charge 12 is not limited to such a concave shape and may be, for example, an M-shape or the like. The furnace body is made of an iron furnace wall 11 and firebricks 15 provided in the outer wall 11. An upper portion 13 of the furnace wall 11 is conical. On the inclined upper portion 13 are provided diametrically opposed light emission window 14 and light receiving window 16. The opposed windows 14 and 16 are placed so that the distance between them in the horizontal direction is L (FIG. 1).

Outside the furnace 10 is provided a light transmitter 50 having a giant pulse laser device 51 serving as a light source which may be, for example, a yttrium-aluminum-garnet (YAG) laser capable of producing giant pulses.

The transmitter 50 also has a laser oscillator 53 and a transmitting scanner 55, as shown in FIG. 2. The laser oscillator 53 and the transmitting scanner 55 are combined into one unit.

Figure 3:
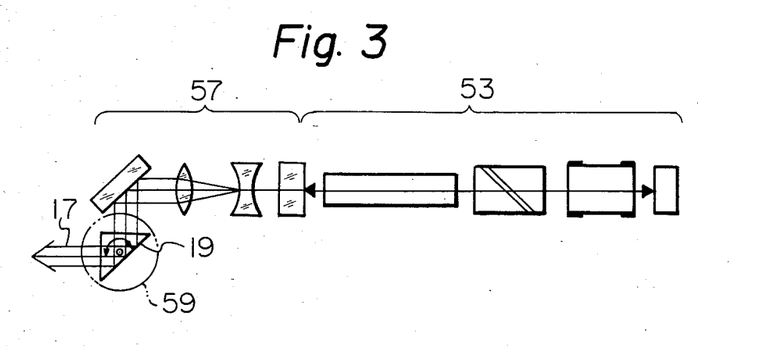
FIG. 3 is a diagram of a light transmitter shown in FIG. 2.

The laser 17 is transmitted into the scanner 55 through a mirror and lens assembly (collimator) 57 (FIG. 3). The scanner uses, for example a rotating prism 19. The laser beam is reflected totally by the prism, and is transmitted into the blast furnace through the window 14. The scanner is driven by a stepping motor 59, in a remote control manner, to fully scan the top surface of the charge 12, and its angle is detected by a rotary encoder (not shown). The transmitter 50 is, per se, known.

Figure 4:
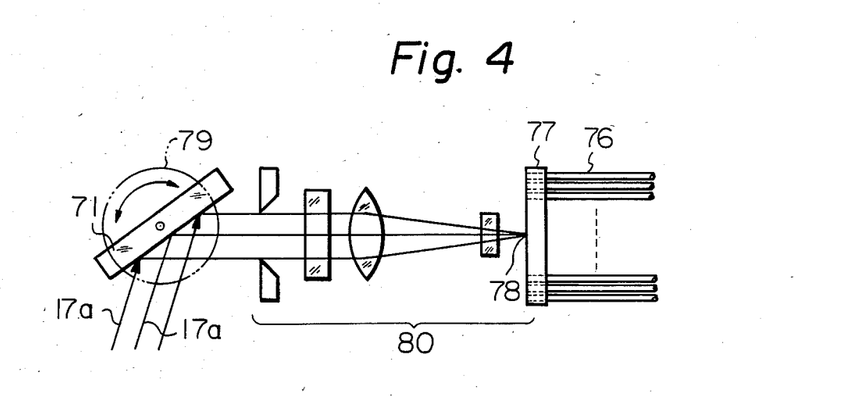
FIG. 4 is a diagram of a light receiver shown in FIG. 2.

A light receiver 70 has a receiving scanner 71, a receiving telescope 80, and a signal converter 75. The scanner 71 and the telescope 80 are combined into one unit and installed adjacent to the window 16. The receiver 70 is shown in FIG. 4.

The scanner 71 is, for example, an aluminum-coated mirror which can be rotated by a stepping motor 79. The view angle of the receiver 70 is, for example, about 5.5°, but it covers all of the top surface of the charge 12 in a plane by the rotation of the scanner.

At the image plane 77 of the telescope 80, there is an optical fiber bundle 76 which transmits light to a signal convertor 75. The fiber bundle is segmented, for example, into 32 channels.

The signal converter 75 has, for example, 32 photomultipliers which are ultra-highly sensitive photodetectors and 32 channels of high-speed analog-to-digital (A/D) converter.

The high voltage supplied to the photomultipliers is controlled by a system controller 90. The output of the photomultipliers is amplified and converted from an analog signal to a digital one by the A/D converter, per se known.

In other words, the receiver is a 32-channel linear array receiver with ultra-high sensitivity.

Figure 5:
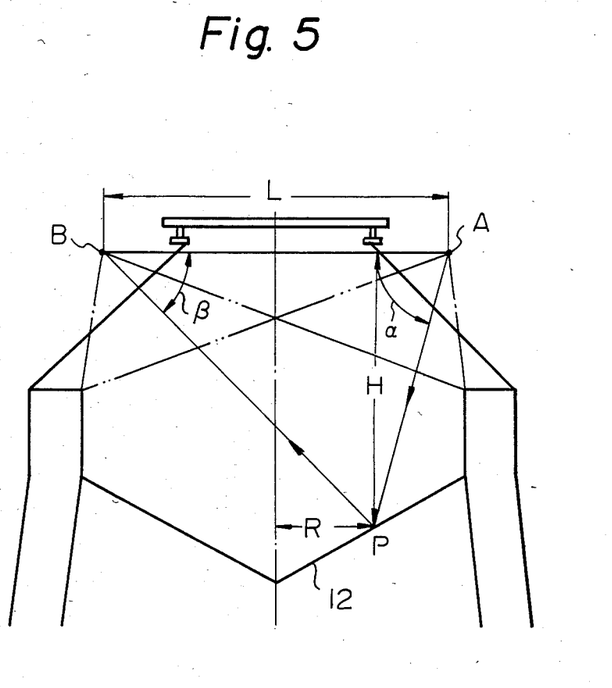
FIG. 5 is a schematic view showing a principle of triangulation.

The system controller 90 has a minicomputer 93, and a cathode ray tube (CRT) display 91. The minicomputer 93 controls the transmitter and the receiver, and performs profile calculation. The CRT 91 graphically displays the measured result. As shown in FIG. 5, when a sharp laser beam is projected from the transmitter at the transmitting position A onto the top surface of the charge 12 through the window 14, the receiver on the other side located in a vertical plane including the corresponding diameter of the furnace catches the spot of light on the surface of the charge 12 at the receiving position B. The light emitting angle of the light incident upon the top surface of the charge 12 through the light transmission window 14, with respect to the horizontal direction is $\alpha$, and the light receiving angle of the light reflected from the top surface into the window 16, with respect to the horizontal direction is $\beta$. When the light receiver occupies a correct angular position in which the light ray of the angle $\beta$ comes into the center of the field of view, a beam spot of the incident point on the top surface of the charge 12 is focused and imaged at the center of the field of view, i.e., at the center 78 (FIG. 4) of optical fiber array. When the light emitting and receiving angles $\alpha$ and $\beta$ at a light transmission position A and the light receiving position B, and the distance L between the two positions A and B are known, the incident point P on the top surface of the charge 12 can be obtained by triangulation.

In this case, the location of the illuminated point P is calculated using the following equations.

$$H = L \cdot \frac{\sin\alpha \cdot \sin\beta}{\sin(\alpha + \beta)} \quad (1)$$

$$R = \frac{L}{2} \cdot \frac{\sin(\alpha - \beta)}{\sin(\alpha + \beta)} \quad (2)$$

where
| | | |
|---|---|---|
| $\alpha$: | the projection angle (light emitting angle) | [rad] |
| $\beta$: | the reception angle (light receiving angle) | [rad] |
| $L$: | the distance between the two positions A and B | [m] |
| $H$: | the verticle distance from | [m] |

| | -continued | |
|---|---|---|
| R: | a horizontal line connecting the positions A and B the radical distance from a center of the furance | [m] |

By successively changing the angle $\alpha$ of the incident light through the light transmission window 14, the profile of the top surface of the charge 12 can be detected in a similar way by triangulation.

As mentioned before, in the prior art, a light receiver having a large field of view was used. In the arrangement shown in FIG. 1, the field of view had to cover the diameter of the furnace 10, since the optical detector was immovable. The diameter of the furnace 10 is usually, for example, around 6500 mm. Accordingly, if the resolving power of the light receiver is 1/100, the resolution limit thereof on a horizontal line is 65 mm, which is insufficient. On the other hand, when a receiver having a small field of view is used, as in the present invention, assuming the field of view of the receiver is 1/10 the diameter of the furnace, the small field of view is 650 mm. If the resolving power is 1/100, the resolution limit thereof on a horizontal line is 6.5 mm, far higher than the prior art.

There are many other advantages of the use of a receiver with a small field of view. In case of a large field of view, a large amount of signals has to be processed to abstract or select effective light from that received by the receiver. With a small field of view, the amount of signals to be processed is considerably smaller. Therefore, in view of signal processing, a small field of view is more advantageous. This is particularly true when correlation processes are necessary. In this case, the small field of view is considerably advantageous since the amount of signals to be processed increases in proportion to square of the field of view.

Furthermore, in the case of a large field of view, the optical detector (receiver) tends to receive or catch scattered strong laser rays within the field of view. Accordingly, it is necessary to make the dynamic range of the optical detector 18 large, or the strength of signals of the effective irregularly reflected light beams 17a relative to that of spurious signals of the scattered light beams becomes small, resulting in a decreased signal-noise (S/N) ratio.

In addition to the above, a large field of view must cover the entire top surface of the charge 12. However, it is very difficult to carry out focusing commonly over the entirety of the field. On the contrary, with a small field of view, focusing can be effected for each individual field, even when a high speed lens, for example, having an F number equal to 2 is used. Accordingly, the optimum focal point can be obtained for each field.

As can be understood from the above description, the adoption of an optical detector (light receiver) with a small field of view is very advantageous. As stated earlier, however, the tracking method has been technically difficult. The tracking method of the optical detector according to the present invention will now be discussed.

The laser beam 17 can be made incident upon the top surface of the charge 12 through the window 14 at any light emitting angle $\alpha$ (e.g., $\alpha=90°$) by moving the scanner 19, as mentioned before. For clarification of the explanation, now suppose that the laser beam is incident upon the top surface of the charge 12 by the scanner 19, which can rotate about the point A shown in FIG. 5, and that the light receiver 70 is of small field of view and can rotate about the point B so as to effect angular movement or tracking, for example, by a stepping motor. The angular tracking of the receiver 70 can be effected by the rotation of the receiver itself about the point B. Alternatively, when the receiver has therein a light receiving mirror, such as the scanner mirror 71 (FIG. 4) for reflecting the light beams, the angular tracking can be effected also by the angular movement of the mirror about the point B. Since the profile of the top surface of the charge 12 is unknown before the detection is completed, a point P1 on the top surface must be first detected. The light emitting angle of the laser beam at the light transmitting point A is fixed to $\alpha_1$ which is, for example, 90°, in FIG. 6. Then, the receiver 70 performs angular movement to scan the total field of view (which corresponds to the diameter of the furnace in the illustrated embodiment) at a constant angular speed. When the optical fiber array catches, at the center thereof which corresponds to the center of field of view, the beam spot of the point $P_1$, the movement or tracking of the receiver 70 (i.e., the scanner 71) is stopped. Thus, the light receiving angle $\beta_1$ of the reflected laser beam 17a at the light receiving point B is calculated. The point P1 can be detected from the distance L between the two points A and B and the two angles $\alpha_1$ and $\beta_1$ by triangulation, as mentioned before.

Figure 6:
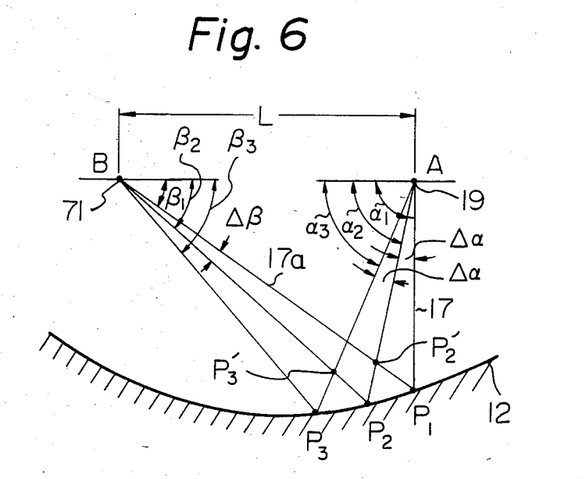
FIG. 6 is a schematic view of a tracking method of a light receiver in accordance with the movement of the light beams reflected from the top surface of the charge in the blast furnace according to the present invention.

After the point P1 is thus obtained, successive points P2, P3, ..., Pn, on the top surface of the charge 12 are detected. Theoretically, any point Pi (i is a positive integer more than 1) on the top surface can be detected by the same method as that for obtaining the first point P1. This, however, would take a long time, as since the receiver would have to scan the wide angle covering the diameter of the furnace whenever detecting the point Pi. Therefore, it is not practicable to detect the point Pi by the same method as in the first point P1.

In order to detect a second point P2 adjacent to the first point $P_1$, the light emitting angle $\alpha$ is changed by a small angle $\Delta\alpha$ so that the light emitting angle $\alpha$ is $\alpha_2$ ($\Delta\alpha=\alpha_2-\alpha_1$), by means of the scanner 19.

According to the first embodiment of the present invention shown in FIG. 6, since $\Delta\alpha$ is a very small value, the light receiving angle $\beta_2$ of the beam reflected from the point P2 can be assumed to be identical to that ($\beta_1$) of the beam reflected from the known point P1. Namely, the second point P2 is temporarily assumed, i.e. as a first approximation to be identical to an imaginary point P2' which is located on a line connecting the points A and P2 and on a line connecting the points $P_1$ and B. Therefore, it is not yet necessary to change the reception angle $\beta$ at this state. However, the actual point P2 on the top surface of the charge 12 is different from the assumed point P2'. Accordingly, the beam spot on the image plane 77 (FIG. 4) of the receiver 70 is deviated from the center of the field of view. From this deviation, the true light receiving angle $\beta_2$ of the light beam reflected from the point P2, which angle is slightly different by the very small angle $\Delta\beta$ from the light receiving angle $\beta_1$ of the light beam reflected from the point P1 (and P2'), can be easily mathematically given, by a well known optical principle shown in FIG. 8.

Figure 8:
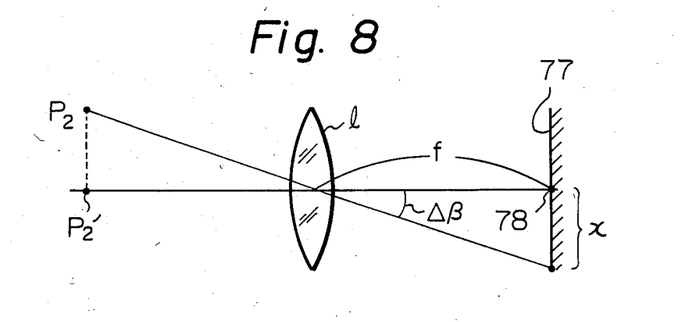
FIG. 8 is a schematic view for explaining how to obtain a light receiving angle of a reflected beam by deviation of a beam spot of the reflected beam from a center of field of view.

That is, in FIG. 8, when a beam spot of the point P2 formed on the image plane 77 (see also FIG. 4) is deviated from the center 78 (see FIG. 4) of the image plane by a deviation x, the angle $\Delta\beta$ is approximately given by the following equation;

$\Delta\beta=\tan^{-1}(x/f)$, wherein f is a focal length of a lens 1). Therefore, when the deviation x is known, the angle $\beta_2$ can be obtained ($\beta_2=\beta_1+\Delta\beta$). Then, from the two angles $\alpha_2$ and $\beta_2$ and the distance L between the two points A and B, the second point P2 can be detected. After that, the scanner 71 is rotated by the small angle $\Delta\beta$ so that the beam spot of the second point P2 comes into the center of the field of view. Similarly, the successive points P3, P4, ... Pn can be detected by changing the projection angle $\alpha$ by $\Delta\alpha$ at one time. That is, when the third point P3 adjacent to the second point P2 is detected, the reception angle $\beta_3$ of the light beam reflected from the third point P3 is assumed to be identical to that of the light beams reflected from the second point P2. Namely, the third point P3 is assumed to be identical to an imaginary point P3' which is located on a line connecting the points A and P3 and on a line connecting the points B and P2. The projection angle $\alpha_3$ of the light beam incident on the third point P3 is different from $\alpha_2$ by the small angle $\Delta\alpha(\Delta\alpha=\alpha_2-\alpha_3)$.

It should be noted that the variation in the projection angle $\alpha$ at one time is commonly identical to $\Delta\alpha$ whenever the successive points P2, P3, P4, ... Pn are detected, in the embodiment shown in FIG. 6.

Figure 7:
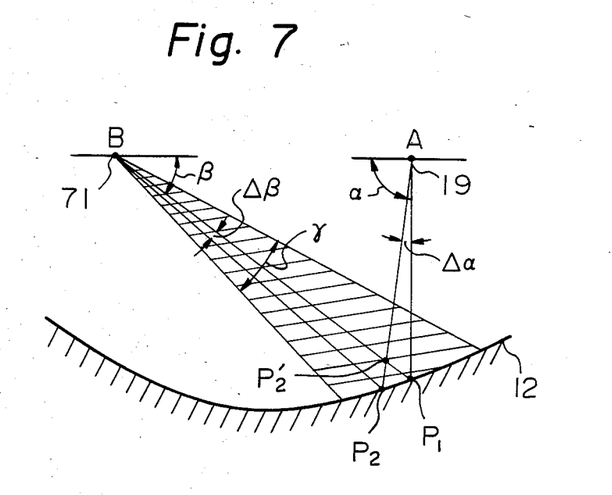
FIG. 7 is a view similar to FIG. 6, showing a field of view of a light receiver, according to the present invention.

With reference to FIG. 7, if the small field of view of the receiver is designated by the angle $\gamma$ and a small angle variation of the light receiving angle $\beta$ when the light emitting angle varies by a small variation $\Delta\alpha$ is designated by $\Delta\beta$, the small angle variation $\Delta\beta$ is preferably selected by a reason which will be explained hereinafter, so that it satisfies the following relationship;

$$\Delta\beta<\gamma/4$$

It goes without saying that $\Delta\beta$ and $\Delta\alpha$ must be determined taking into account the irregularity of the top surface of the charge 12.

Figure 9:
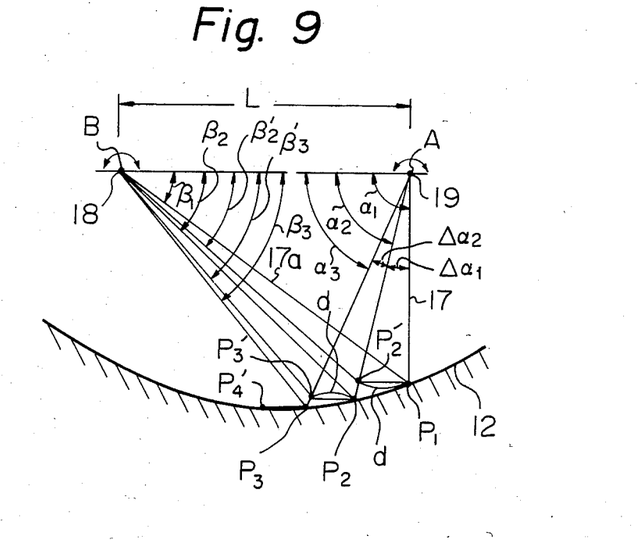
FIGS. 9 and 10 are schematic views of different embodiments of the tracking method of the light receiver according to the present invention; and, FIG. 11 is a photograph showing a experimental result of a surface profile displayed on a monitor, according to the present invention.

According to another embodiment of the present invention, shown in FIG. 9, the second point P2 adjacent to the first point P1 is assumed to be a point P2' which is identical to the first point P1 in the vertical position and different from the first point P1 through d in the horizontal direction. The light emitting angle $\alpha_2$ is determined so that the laser beam 17 passes through the point P2'. In other words, the light emitting angle $\alpha_2$ is displaced by an value $\Delta\alpha_1$ corresponding to the horizontal distance d. In this embodiment, the horizontal displacement d is always constant. When the second, third, ... n points P2, P3, ... $P_n$ are detected. The light receiving angle $\beta_2'$ is mathematically obtained by triangulation, since the point P2' is known, as similar to the first embodiment. Then, the scanner 71 performs angular movement by a small angle $(\beta_2'-\beta_1)$ so that the light receiving angle becomes equal to $\beta_2'$. This angular movement can be effected within an extremely short space of time, since the angle $\beta_2'$ is previously known.

It should be noted here that the point P2' is different from the actual light illuminating point P2. Accordingly, the beam spot of the beam reflected from the point P2 is deviated from the center of the field of view. From the deviation of the spot from the center of the field of view, the true light receiving angle $\beta_2$ can be mathematically obtained, similar to the first embodiment. From the two angles $\alpha_2$ and $\beta_2$ and the distance L between the two points A and B, the point P2 can be calculated by triangulation, as mentioned before.

The above-mentioned processes are repeated to calculate the successive points P3, P4, ..., Pn. That is, after the detection of the second point P2, the light emitting angle $\alpha_2$ is displaced by the value $\Delta\alpha_2$ corresponding to the horizontal distance d so that the laser beam 17 passes through the third point P3' adjacent to the second point P2. Before the detection of the third point P3, the point P3 is assumed to be a point P3' which is identical to the point P2 in the vertical position and which is spaced from the point P2 by the distance d in the horizontal direction. After that, the light receiving angle $\beta_3'$ corresponding to the supposed point P3' is first obtained in the same way as that used for the second assumed point P2'. The receiver causes the angular movement so that the light receiving angle becomes equal to $\beta_3'$. Then, from the deviation of the beam spot of the light beam reflected from the third point P3, from the center of the field of view, a true light receiving angle $\beta_3$ corresponding to the third point P3 can be obtained. Finally the third point P3 is calculated by triangulation from the two angles $\alpha_3$ and $\beta_3$ and the distance L.

It will be appreciated that the variations $\Delta\alpha_1$, $\Delta\alpha_2$... are usually not identical to each other.

By the aforementioned detection method, all points P2, P3, ..., Pn, can be calculated, so that the profile of the top surface of the charge 12 can be determined.

It will be appreciated that if the field of view of the receiver is supposed to be a circle having a diameter D, the constant distance d preferably satisfies the following relationship, similar to the case shown in FIG. 7; d < D/4. Of course, the distance d is determined taking the degree of irregularity of the top surface of the charge 12 into consideration. The distance d can be minimized, because even if the distance d is as small as possible, there is no possibility that the beam spot comes out of the field of view, resulting in failure of angular movement of the light receiver. However, when the distance d is extremely small, measurement of the profile takes a long time. On the contrary, if the distance d is large, the beam spot may not fall within the field of view, depending on the irregularity of the top surface of the charge, thus resulting in failure of angular tracking of the optical detector (light receiver). Even in failure, however, any point on the top surface of the charge can be calculated by the method the same as that used for calculating the first point P1.

Figure 10:
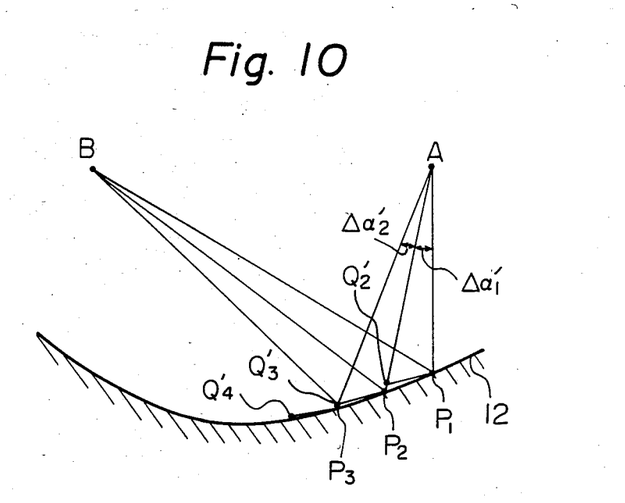

Alternatively, if the profile of the top surface of the charge 12 is generally known in advance, another detecting method can be adopted in place of that which assumes the point P2' having the same vertical position as the point P2. Namely, it is possible to assume a different point Q2' which is closer to the point P2 than the point P2' as shown in FIG. 10. That is, the point Q2' is on the line connecting the two points A and P2 and is closer to the point P2. It will be easily understood that the error in the assumption of the point Q2' is smaller than that of the point P2'.

In the embodiment shown in FIG. 10, the variations $\Delta\alpha_1'$, $\Delta\alpha_2'$... are usually different from each other.

According to the arrangement shown in FIG. 10, the possibility of failure of angular tracking is considerably small even when the distance d is larger in comparison with the arrangement shown in FIG. 9. In other words, the distance d can be increased without fear of failure of the angular tracking, according to the arrangement shown in FIG. 10.

Usually, 20 or 30 measuring points P1, P2, ... P20 or P30 in a same vertical plane, which preferably includes a diameter of the furnace, are calculated to measure the top surface profile of the charge in the blast furnace. Furthermore, the measurements of the top surface profile are repeated at a predetermined interval. Therefore it is possible and preferable to use the results of the directly preceding measurements as the generally and previously known profile in the embodiment shown in FIG. 10. Namely, the imaginary points $Q_2'$, $Q_3'$ ... are located on the profile which has been determined by the preceding set of detections and calculations.

Figure 11:
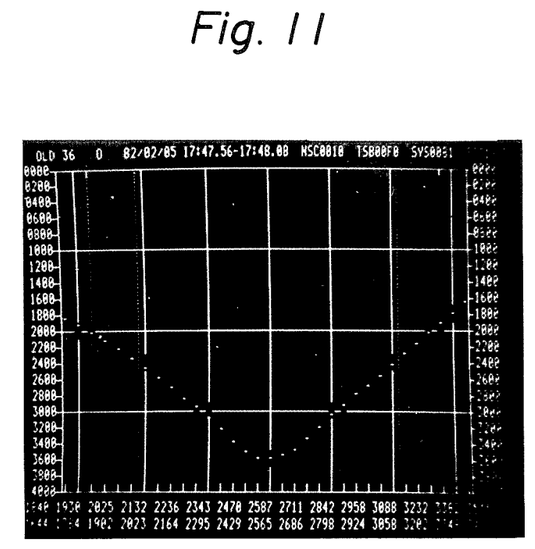

FIG. 11 is a photograph showing an example of the profile just after the charging of ore, displayed on the CRT display 91 (FIG. 2). The vertical axis in the display shows the depth in mm units, and the horizontal axis shows the location along the diameter. The distance between two adjacent horizontal lines is equivalent to one meter. On the top horizontal line in the display, there are some data, such as the kind of charge, measurement starting time, measurement stopping time, and equipment conditions. On the two bottom horizontal lines, there are 33 pieces of numerical profile data in mm units.

As can be seen from the above discussion, according to the present invention, use of an optical detector having a small field of view increases the resolving power thereof and enables precise measurement of the profile of the top surface of a charge in a blast furnace.

In particular, the invention is advantageously used with a laser profile meter, since the drawbacks accompanied by the optical detector having a large field of view as in the prior art and as mentioned before can be eliminated.

Because all the devices are installed outside of the blast furnace, the apparatus is not influenced by the severe environment in the furnace, and is easy to maintain.

It should be noted that although the above discussion was directed only to an increment of the small variation of the light emitting angle $\alpha$, the invention can be similarly applied to a decrement thereof. Furthermore, according to the invention, since the detection of the successive points on the top surface of the charge can start from the result of the preceding measurements, it is not necessary to mathematically obtain the original light emitting angle and light receiving angle used for detecting the first point P1 after the detection of the first point, resulting in quick and easy measurement of the profile of the top surface of the charge.

We claim:

1. A method for measuring a profile of a surface of a material contained in a container by use of an optical detector capable of angular tracking and having a light receiver of a small field of view relative to the area of said surface, comprising:

a first set of steps for determining the location of a first point on said surface of the material, comprising:

emitting a laser beam pulse from a pulsing laser onto a first point $P_1$ on said surface of the material from a predetermined light-emitting position at a light-emitting angle $\alpha_1$, detecting the light-receiving angle $\beta_1$ of said laser beam pulse as reflected from said point at a predetermined light-receiving position which is spaced at a distance L from said light-emitting position, by causing angular movement of an optical detector which has a small field of view relative to the area of said surface, until that optical detector catches, centrally of said small field of view thereof, a beam spot of the light reflected from said first point, and calculating the location of said point as a known first point from the two angles $\alpha_1$ and $\beta_1$ and the distance L;

a second set of steps for determining the location of a second point on said surface of the material adjacent to said first point, comprising:

changing the light-emitting angle of emission of said laser beam through a small angle $\Delta\alpha$, to $\alpha_2$, so that a succeeding pulse of said laser beam is incident upon a second point $P_2$ on the surface of the material which point is adjacent to said first point $P_1$ along a predetermined path, detecting the light-receiving angle $\beta_2$ of said laser beam pulse as reflected from said second point so as to form a beam spot on said optical detector at a point that is deviated from the center of said small field of view of said optical detector, at the predetermined light receiving position, and calculating the location of said second point as a known second point from the two angles $\alpha_2$ and $\beta_2$ and the distance L; and a set of succeeding steps for successively detecting succeeding points along said path on the surface of said material by repeating said second set of steps at least once, each time in relation to a respective previously-conducted said set of succeeding steps.

2. A method according to claim 1 wherein, as part of conducting said second set of steps, for calculating the location of said second point, the light receiving angle of the beam reflected from the second point is as a first approximation assumed to be identical to that of said laser beam as reflected from said first point and further comprising calculating the location of said second point in part by measuring the amount of deviation of the beam spot of said laser beam reflected from said second point from the center of the field of view of said optical detector.

3. A method according to claim 2, wherein the light emitting angle varies by a same value $\Delta\beta$ at one time every time the locations of said points following the first point are calculated and the variation of the light emitting angle starts from the light emitting angle used in the respectively immediately preceding said set of steps.

4. A method according to claim 1, wherein in the course of calculating the location of said second point, the light receiving angle of said laser beam reflected from said second point is as a first approximation assumed to be identical to that of said laser beam as reflected from a point which is spaced along said path from said first point by a small distance d in the horizontal direction and which is identical to the first point in vertical position, and further comprising calculating the location of said second point by measuring the deviation of the beam spot of said laser beam reflected from said second point from the center of the field of view of said optical detector.

5. A method according to claim 4, wherein in the course of calculating the locations of said points following said second point, the light receiving angles of said laser beam as reflected from the associated said points are as a first approximations assumed to be identical to those of said laser beam as reflected from points which are spaced from the respective preceding said points successively by intervals each having the same small distance d in the horizontal direction and which are identical to the preceding points in vertical position, and further comprising calculating the location of each respective associated point by measuring the deviation of the beam spots of said laser beam reflected from said associated points from the center of the field of view of said optical detector.

6. A method according to claim 1, wherein in the course of calculating the location of said second point, the light receiving angle of said laser beam as reflected from said second point as a first approximation assumed to be identical to that of said laser beam as reflected from a point which is spaced from said first point by a small distance d in the horizontal direction, and said points spaced a small distance d are points on a predetermined general surface profile is very similar to the actual surface profile being measured.

7. A method according to claim 1, wherein in the course of calculating the locations of said points following said second point, the light receiving angles of said laser beam as reflected from the associated said points are as first approximations assumed to be identical to those of said laser beam as reflected from points which are spaced from the respective preceding said points successively by intervals each having the same small distance d in the horizontal direction, and said points spaced a small distance d are points on a predetermined general surface profile is very similar to the actual surface profile being measured.

* * * * *